July 3, 1945. J. F. FALL 2,379,630
PIPE CUTTING MACHINE
Filed April 7, 1941 9 Sheets-Sheet 1

INVENTOR
JOHN F. FALL
BY
ATTORNEYS.

July 3, 1945.  J. F. FALL  2,379,630
PIPE CUTTING MACHINE
Filed April 7, 1941  9 Sheets-Sheet 3

INVENTOR
JOHN F. FALL
BY
ATTORNEYS.

July 3, 1945.  J. F. FALL  2,379,630
PIPE CUTTING MACHINE
Filed April 7, 1941  9 Sheets-Sheet 4
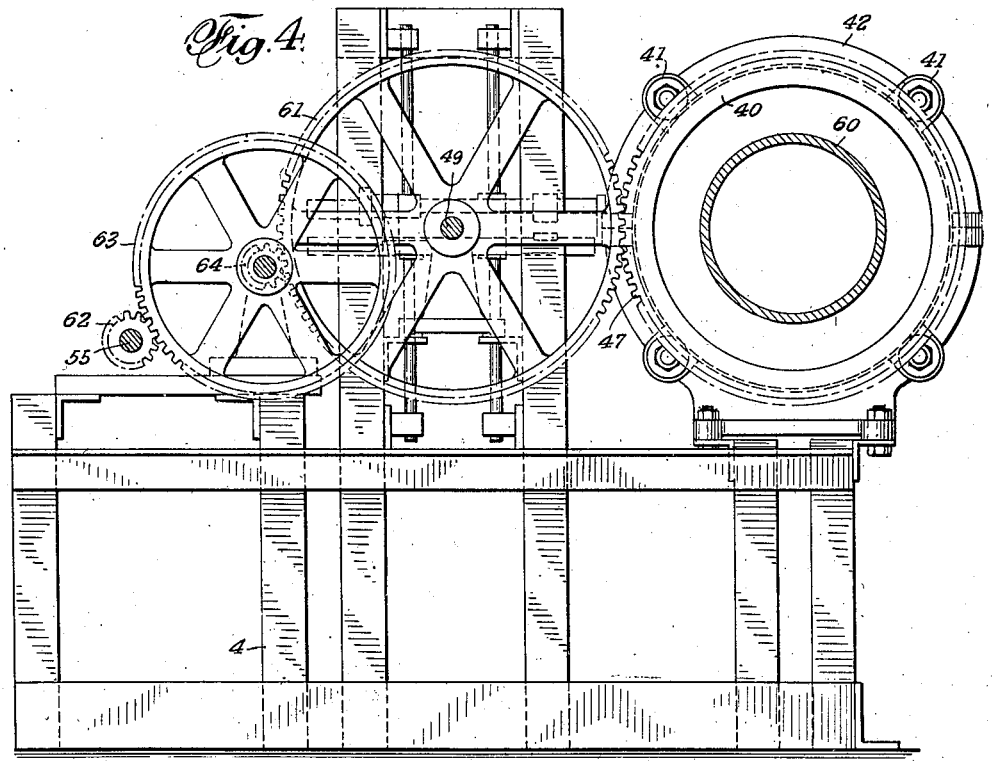
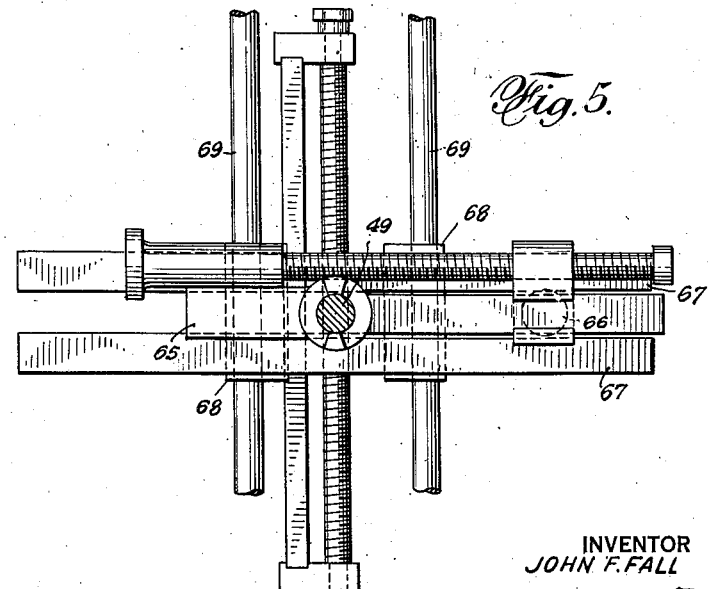
INVENTOR
JOHN F. FALL
BY
ATTORNEYS.

July 3, 1945.  J. F. FALL  2,379,630
PIPE CUTTING MACHINE
Filed April 7, 1941   9 Sheets-Sheet 5

INVENTOR
JOHN F. FALL
BY
ATTORNEYS.

July 3, 1945.  J. F. FALL  2,379,630
PIPE CUTTING MACHINE
Filed April 7, 1941  9 Sheets-Sheet 6
Fig. 8.
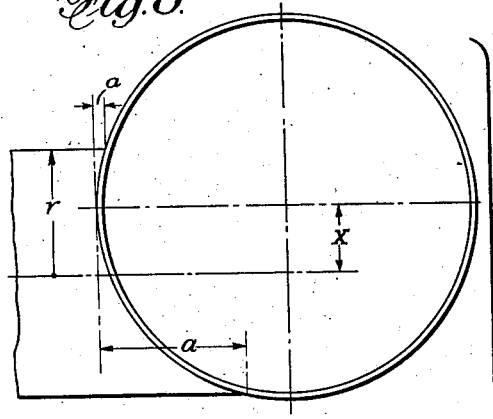
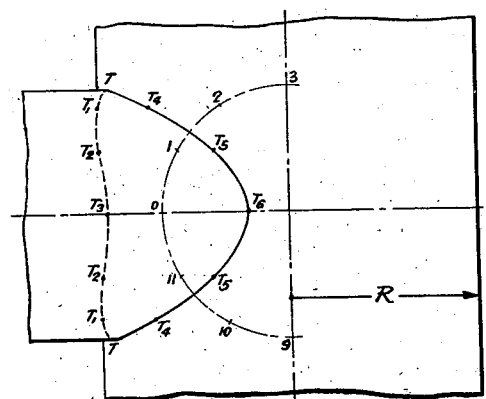
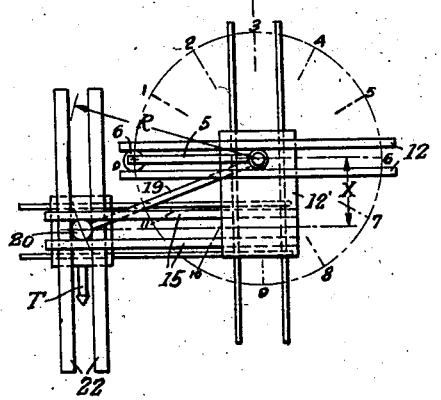
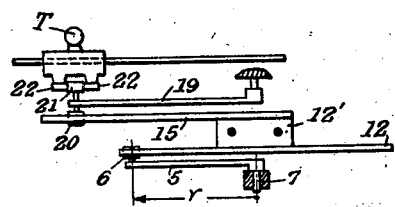
Fig. 9.
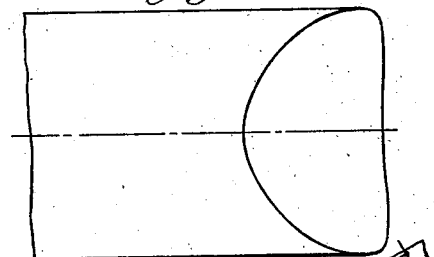
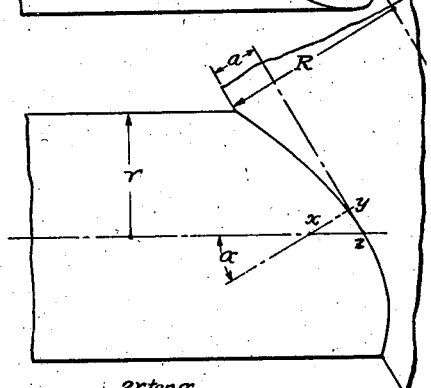
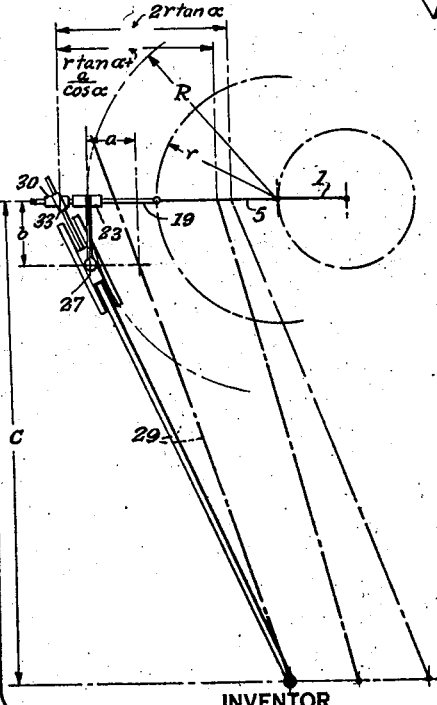
INVENTOR
JOHN F. FALL
BY
ATTORNEYS.

July 3, 1945.　　　J. F. FALL　　　2,379,630
PIPE CUTTING MACHINE
Filed April 7, 1941　　　9 Sheets-Sheet 7
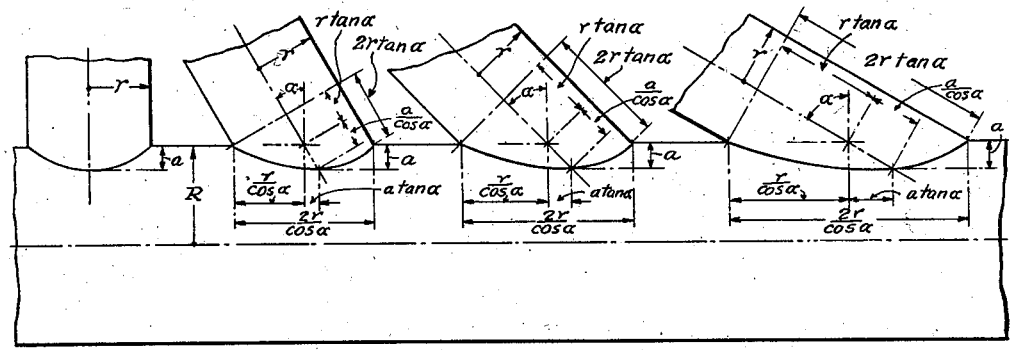
Fig. 10.
Fig. 11.
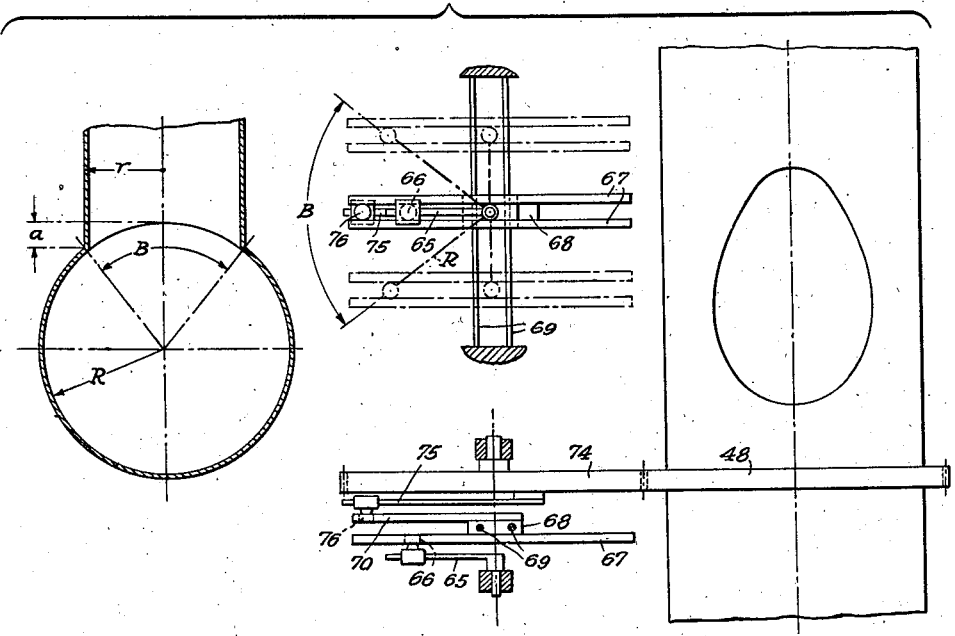
INVENTOR
JOHN F. FALL
BY
ATTORNEYS.

July 3, 1945. J. F. FALL 2,379,630
PIPE CUTTING MACHINE
Filed April 7, 1941 9 Sheets-Sheet 8

INVENTOR
JOHN F. FALL
BY
ATTORNEYS.

July 3, 1945.　　　　J. F. FALL　　　　2,379,630
PIPE CUTTING MACHINE
Filed April 7, 1941　　　9 Sheets-Sheet 9

INVENTOR
JOHN F. FALL
BY
ATTORNEYS.

Patented July 3, 1945

2,379,630

UNITED STATES PATENT OFFICE 2,379,630

PIPE-CUTTING MACHINE

John Francis Fall, New Paltz, N. Y.

Application April 7, 1941, Serial No. 387,152

10 Claims. (Cl. 33—21)

My invention relates to pipe cutting apparatus and the like.

It is an object of the invention to provide improved apparatus of universal application to the cutting of pipes.

A more specific object of my invention contemplates the provision of improved means for the accurate cutting of pipe for joinder with other pieces of pipe at any desired angle and with any amount of axial offset.

Another object is to provide apparatus for automatically devolping on a pipe surface the line of intersection with that surface of a plane or curved surface.

It is another object to provide improved automatic cutting mechanism of the character indicated requiring a minimum of setting-up adjustments.

Another object is to provide an improved pipe cutting machine and the like with simple readily adjusted means to take care of different pipe sizes and offsets.

Other objects and various features of novelty and invention will become apparent or will be pointed out in the following specification.

Some preferred embodiments of features of the invention are incorporated in the structures shown herein for illustrative purposes only.

In the drawings—

Fig. 4 is a view similar to Fig. 3, taken substantially in the plane of the line 4—4 of Fig. 1;

Fig. 5 is an enlarged fragmentary view of details of the structures illustrated in the previous figures;

Figure 12:
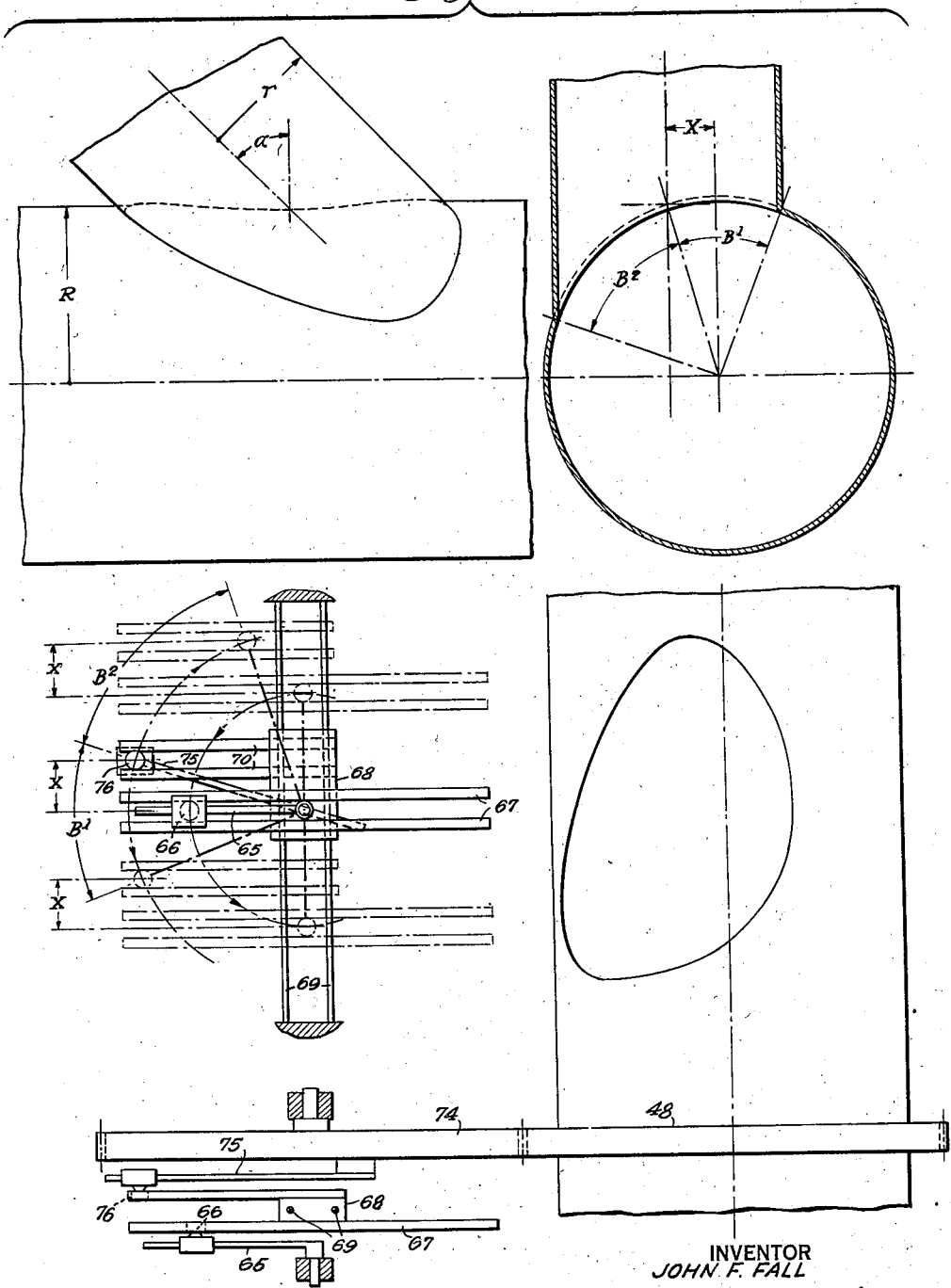
Figure 13:
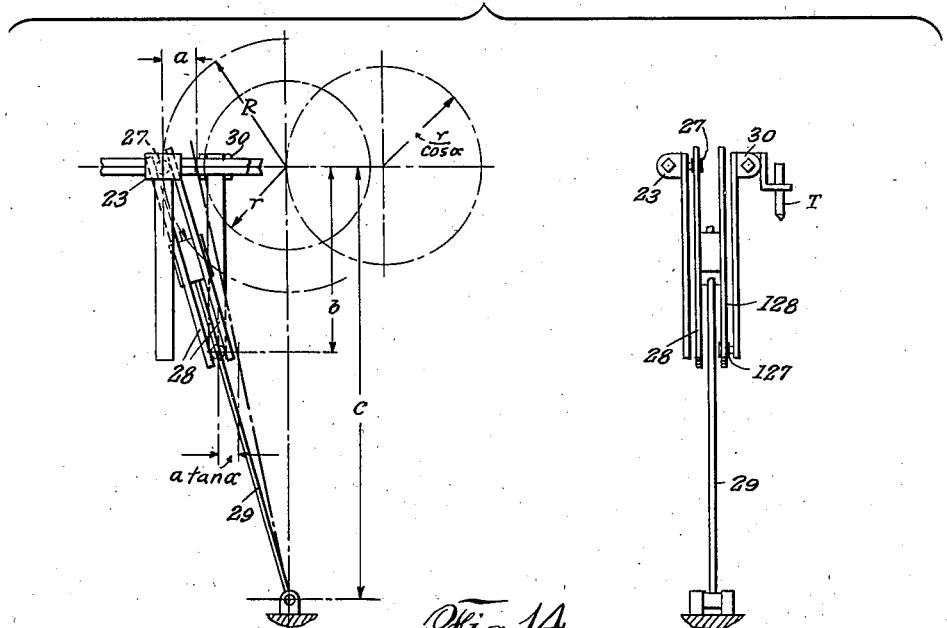
Figure 14:
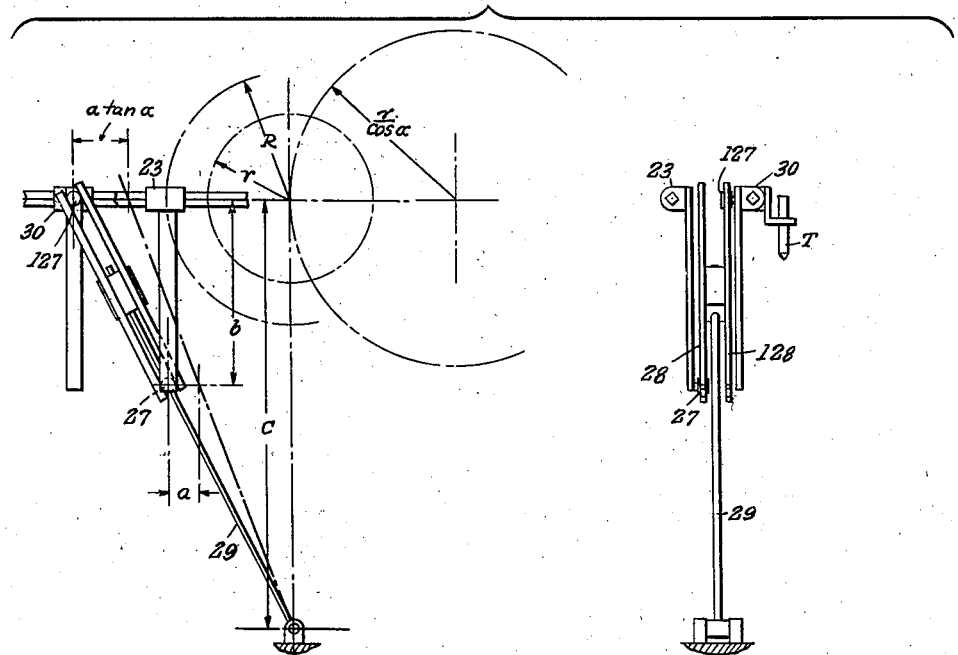

Figs. 6, 7, 8, and 9 are more or less diagrammatic views illustrating theoretical geometric developments of biases or cuts on the ends of cylindrical bodies;

Fig. 10 is a further diagrammatic view illustrating theoretical geometric constructions of biases or cuts on the ends of pipes to form varied intersections;

Figs. 11 and 12 are more or less diagrammatic views illustrating theoretical geometric developments in connection with intersection holes cut in the body of a pipe;

Figs. 13 and 14 are more or less diagrammatic or illustrative views, including front and side elevations of certain elementary mechanism of a modified form over that shown in Fig. 9.

Broadly speaking, two different kinds of operations may be performed on a machine embodying features of my invention. Either a particular piece of pipe may be cut off on any desired bias to adapt it for a proper fit to another piece of pipe of the same or larger size at any angle or degree of offset; or an appropriate hole may be cut in the surface of a piece of pipe to accommodate another section of pipe of the same or a smaller size at any angle or degree of offset with respect to the pipe being cut.

In a preferred form of the invention I limit the movement of the cutting or marking tool to reciprocation along a path longitudinal with respect to the axis of the piece of pipe to be cut and rotate the pipe. By varying the relative speeds of rotation of the pipe and displacement of the tool, it will be clear that various biases may be described on the pipe. Although the pipe might be rotated at a variable speed to help generate some particular bias cut, I prefer to rotate it generally at a constant speed and to vary the translatory motion of the cutting means. In order, then, to cut off some particular bias on a pipe, it will only be necessary to rotate the pipe through one revolution while the cutting member traces a complete reciprocation cycle.

When cutting holes in sections of pipe for above-indicated purposes, I provide means for merely oscillating the pipe about its axis in accordance with the kind of fit the pipe is to make. As the oscillation takes place and goes through one complete cycle, the cutting means does likewise along its longitudinal path; and it will be understood that only one cycle of both these operations is required to cut a hole.

Before giving a detailed description of preferred practical apparatus, it will be helpful to note a few of the theoretical considerations behind the derivation of the particular bias or hole cuts that a machine embodying features of my invention may make.

Figure 6:
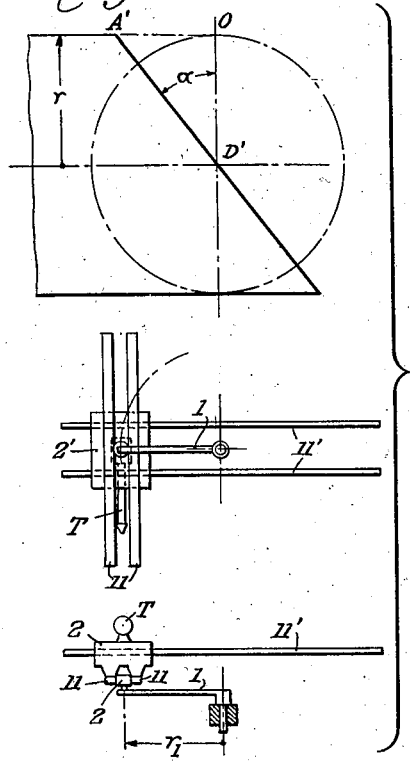

Let us first consider one of the simplest forms of bias, namely, a plane intersecting a piece of pipe of radius $r$ at an angle $\alpha$ with a transverse plane at right angles to the axis of the pipe. It will be understood that this sort of cut would be required if, say, two pieces of pipe of the same diameter were to be joined to each other at the ends at an angle of $2\alpha$ or $180°-2\alpha$. Fig. 6 shows schematically a linkage that may be employed to produce such a cut, together with a geometrical development of that cut. This very simple linkage preferably includes a crank 1 of adjustable radius $r_1$ driven with a steady rotary motion about a fixed center. The free end of the crank may pivotally carry some form of slide 2 guided in guide means 11—11. The guide means 11—11 is preferably mounted as a unit on a slide block 2' slidable transversely on guides 11'—11' at right angles to the guides 11—11 and carries the cutting implement T such as a torch. It will be understood that the foregoing is nothing more than a means for obtaining simple-harmonic displacement motion of the cutting implement T. When the crank 1 is rotated with the same angular velocity as the pipe (radius $r$) to be cut and the cutting implement T is directed along a longitudinal path on the surface of the pipe, the cutting member T will develop the locus of points of intersection of the pipe being cut with a plane at an angle $\alpha$ with a plane at right angles to the pipe axis, as will be clear.

From a study of the geometry of the intersection, as shown in Fig. 6, it will be seen that the angularity of the intersection may be varied by changing the length of the crank 1. The relationship between the length of this crank and the angle $\alpha$ may be appreciated from an examination of the triangle A', O, D', from which the effective radius of the crank 1 may be seen to be $r \tan \alpha$.

Another type of mechanism is required when a pipe of one diameter is to be joined to a pipe of another diameter. Let us assume the simplest case (Fig. 7) of this kind of joint, namely, when the axes of both pipes are in the same plane and at right angles to each other.

Figure 7:
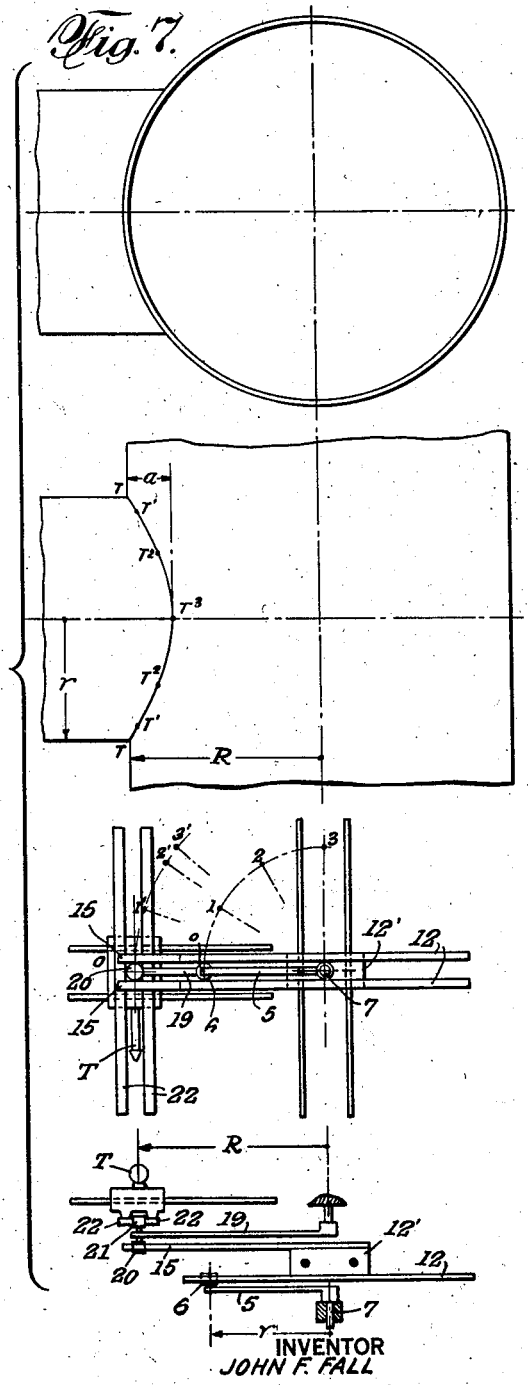

In the geometric developments of Fig. 7, the small pipe is of radius $r$, and the large pipe R. Mechanism required for cutting the proper bias on the end of the small pipe is shown as being distinct from and slightly more complex than that required for making the cut of Fig. 6. In a preferred form a crank 5 is rotated with steady angular velocity about a definite center on shaft 7. The free end of the crank 5 carries a pin roller 6 which may engage and be guided by guide means 12. The guides 12 may be mounted as a unit upon a slide block 12' which is slidable at right angles to the longitudinal direction of the guides 12. Up to this point, the mechanism is similar to that of Fig. 6, that is, steady rotary motion of the crank 5 will impart simple-harmonic transverse displacement motion to the guide block 12', as will be clear.

In the form shown, another guide means 15 is fixedly mounted in the same sense and to the same sliding block as is the guide means 12. The simple-harmonic reciprocating motion of the guide members 15 may be used to drag a pin roller, associated with one end of a crank 19, up and down. The crank 19 is preferably free to rotate about a fixed center coaxial with that of the drive shaft 7. It will be appreciated, then, that as the guides 12 and 15 are reciprocated up and down, the fixed center of crank 19 will force the pin roller 20 (at the other end of crank 19) to be displaced along the guide members 15 in which it slides. This displacement of the pin roller 20 is employed directly to displace the cutting means T along its slide, but since the pin roller 20 reciprocates along with the slide tracks 15 and 12 in a sense transverse to the sliding path for the cutting member, it is necessary for the pin-roller end of the crank 19 to carry another pin roller 21 running on guiding means 22 to dissipate this transverse motion and to deliver only longitudinal driving motion to the cutting member T. Fig. 7 shows how such a cut would be developed, T, $T_1$, $T_2$, $T_3$ representing the locus of the cutting member as the drive crank 5 is in the angular positions 0, 1, 2, 3, and when the crank 19 is in the positions 1', 2', 3', respectively. It will be observed that a proper bias cut is made when the crank 5 is of a length representing the radius $r$ of the smaller pipe and when the crank 19 is of a radius R equal to that of the larger pipe. By merely making the radii of these two cranks 5 and 19 adjustable, it will be appreciated that this mechanism is adaptable to making appropriate bias cuts for pipes of any size within the limits of adjustment of the cranks 5 and 19.

The next type of joint as to degree of increasing complexity might be a connection of a smaller pipe to a larger one at right angles, but with the axis of one offset from the axis of the other some distance which I shall call X (see Fig. 8). The same mechanism as was employed to generate the bias shown in Fig. 7 may be employed for this offset connection, with the exception that the guide members 15 are displaced from the guides 12 rather than overstanding them. If this displacement between the guides 12 and 15 be made equal to the displacement or degree of offset (X) between the axes of the two pipes, it will be seen that the bias generated on the end of the small pipe will make a correct fit to the larger pipe. In making this cut (see Fig. 8), the positions $T_1$, $T_2$, $T_3$, $T_4$, $T_5$, $T_6$ represent the locus of the cutting implement T for the positions 0, 1, 2, 3, etc., of the drive crank 5.

In reflecting upon the elementary mechanisms thus far described, it will be appreciated that sufficient elements have been disclosed to take account of all the variables that need to be considered for any kind of pipe joint. The variables are: the angle $\alpha$, which represents one-half the obtuse angle of intersection of the axes of two pipes to be joined at the ends or the angle between the axis of the pipe and the plane of the cut or bias; the radius $r$ of the small pipe; radius R of the large pipe; and the amount of offset X between the respective axes of the two pipes to be joined.

The mechanism described in Fig. 6 generated biases taking account of the angle $\alpha$ and the radius $r$. The bias represented the cut required for connection of two pipes of the same size at their ends and at an angle $2\alpha$ to each other. There was no need of taking account of the difference in radii of the joined pipes, nor of any axial offset, since there was none. The mechanism of Fig. 8 generated biases taking account of the offset X of the respective axes and of the difference in radii of the pipes being joined. Thus, these two mechanisms, taken separately, may encompass all the variables encountered in any type of pipe joint, and it remains only to be shown how the two may be combined to cooperatively make apparatus of universal application to the cutting of a pipe.

Fig. 9 shows the elements of such a combination. For the sake of clarity in the lower kinematic diagram some of the elements which have heretofore been described are omitted and only their orbits shown. One of the critical values encountered where two sizes of pipe are joined to each other is the quantity $a$, which represents (see Fig. 7 for the simplest case) the distance along a line normal to the axis of the large pipe when viewed normal to the plane in which the angle $\alpha$ is measured, from the point where the small pipe first enters the larger pipe to the farthest point on the large pipe to which either side of the small pipe extends or penetrates. In Fig. 7, since there was no axial offset to the axes of the two joined pipes, the bias was symmetrical and the distance $a$ was the same on either side of the bias cut on the small pipe. In Fig. 8, the axis of the smaller pipe was displaced from that of the larger pipe a distance X. In this case, then, the value $a$ on one side of the smaller pipe bias is a very small value, and the value $a$ on the other side of the small pipe bias is a relatively large value, as will be clear. In both the above cases, the value $a$ could readily be determined since it could have been measured along the axis of the small pipe. However, in the case of Fig. 9, where the angle $\alpha$ must also be taken into consideration, the value $a$ (see the middle diagram) is not measured along the axis of the smaller pipe but is at an angle $\alpha$ thereto. It will be remembered that the cutting implement T is constrained to move only in a line on the surface of the smaller pipe, parallel to the axis of the smaller pipe. Since in this kind of joint the movement of the cutting implement must somehow take account of the value $a$, the latter must be considered as to its effective value along the path of the cutting implement. From the small triangle $x$, $y$, $z$, it will be seen that this corrected value of $a$ is the hypotenuse $xz$ and equal to $$\frac{a}{\cos \alpha}$$

From further study of the middle diagram of Fig. 9, it will be appreciated that the same value $2r \tan \alpha$ (the same as in the case of Fig. 6) measures the longitudinal distance on the smaller pipe between the point where the smaller pipe first intersects the larger pipe to the point of intersection between these pipes diametrically opposed from the first point. In order, then, to generate the correct bias for pipes of different size joined at an angle $\alpha$ (not the axes), mechanism must be provided to displace the cutting implement, say, a distance equal to $$r \tan \alpha + \frac{a}{\cos \alpha}$$

in the first 90° of rotation of the smaller pipe; then a total displacement of the cutting implement equal to $2r \tan \alpha$ in the next 90° of rotation of the smaller pipe; then a retraction from that point equal to $$r \tan \alpha - \frac{a}{\cos \alpha}$$

in the next 90°; and a return to the starting point in the last 90° of rotation. Such appropriate mechanism is shown in the lower two diagrams of Fig. 9.

The elementary mechanisms of Figs. 6 and 7 are schematically combined in Fig. 9 and show the radius of crank 1 equal to $r \tan \alpha$ (as in Fig. 6), the moving end of which carries the center of the radius vectors $r$ and $R$, representing the orbits of the arms 5 and 19, respectively, of Figs. 7 and 8. In other words, the mechanisms of Figs. 6 and 8 are combined in Fig. 9 by making the crank 1 reciprocate the mechanism of Fig. 8 as a unit with a stroke equal to the quantity $2r \tan \alpha$. Cranks 1 and 5 are still driven at the same angular velocity so that they may each complete their respective cycles in the same interval of time.

In combining these two mechanisms, i. e., those of Figs. 6 and 8, additional apparatus (multiplying mechanism) must be provided to take account of the longitudinal effective value $$\frac{a}{\cos \alpha}$$

of the quantity $a$. Such multiplying mechanism may include the crank 29 fixed at its lower end to a member which is reciprocated according to the throw of crank 1 (as are the cranks 5 and 19). However, instead of having the cutting implement actuated directly by the end of the crank 19, in the form shown it is replaced with a slide operating in the same longitudinal sense as the cutting member but having a transversely extending arm of length $b$. A member 27 at the extended end of this transverse arm is slidable on the crank 29. The free end of the crank 29 may carry slide means 33—30 for directly actuating the cutting implement T.

Now if C is the perpendicular distance from the center of the crank 29 to the paths of either the slide 23 or the slide 30, the relationship of $b$ to $c$ will be: $b = c(1 - \cos \alpha)$. It may then be shown by simple geometry that the mechanism of Fig. 9 will derive the cut for the proper bias of the smaller pipe defined above; that is, it may be shown that the crank and slide mechanism 29, 23, 30 provides a means for multiplying the value $a$ by $$\frac{1}{\cos \alpha}$$

to derive exactly the desired bias.

Now that the criteria and theory of bias cutting (on pipe ends) have been considered, it will be advantageous to describe a preferred form of practical apparatus forming part of the invention, and which may be employed to make the bias cuts heretofore referred to and others.

In a preferred form (see Figs. 1, 2, 3, 4, 5), the mechanism is carried on a sturdy frame which may be made up of angle members 4. The crank 1, which will be remembered from the discussion in connection with Fig. 6, is mounted to rotate about a shaft 3 secured on the frame 4. The crank 1 is of an adjustable radius type, and in the form shown carries a pin roller 2 adjustable thereon as by means of a threaded rod in slide block carrying roller 2. The radius to which this arm is adjusted will be appreciated (from prior discussion) to be $r \tan \alpha$. The pin roller 2 or its slide block preferably engages guide means which, in the form shown, is a pair of vertically disposed tracks 11—11 between which the pin 2 may roll. The tracks 11 may be securely fixed to a rigid structure 8, which may have bearings 9 on bearing shafts 10 on the frame so that the track assembly is slidable longitudinally of the frame. It will be clear then that, as the crank 1 rotates, a longitudinal, simple-harmonic reciprocating motion is transmitted to the structure 8.

In the form shown, energy for rotating crank 1 may be supplied manually by a hand crank 51 on a shaft 50 journaled in the frame 4 of the machine. The shaft 50 carries a gear 52, meshing with a gear 53, carried on a shaft 55, which is also journaled in the frame 4 of the machine. The worm-and-worm-wheel reduction gear train 59, 60 serves to transmit motion from the shaft 55 to the crank shaft 3 at a substantial reduction of speed. In a preferred form, clutch means 81 is provided on the shaft 3 for selectively rendering ineffective the transmission of energy from the gear train just described to the crank 1.

In the form shown, the structure 8 carries journal mountings for the shaft 7 of the crank 5 (the identity of which will be recalled from the discussions in connection with Figs. 7 and 8). The crank 5 is preferably of the same adjustable character as crank 1 heretofore described, and may carry slidable pin-roller means 6 at its free end movable in guides 12. It should be noted that in a machine as herein shown the guides 11 and 12 must be at right angles to each other. The crank 5 is preferably rotated from the same source as was employed in connection with rotation of crank 1. In order to have the crank 5 complete a cycle within the same period as the cycle for crank 1, it is preferable that the gear reduction between the prime mover 51 and both crank 1 and crank 5 be the same. In the form shown, energy is transmitted from the prime mover gear 52 to a gear 54 preferably of the same size, as regards number of teeth, as the gear 53. The gear 54 rotates on a shaft 56, which, like the shaft 55, is journaled in the frame 4 of the machine. The shaft 56 preferably has a longitudinally extending keyway (not shown) on its outer surface. In the form shown, motion is transmitted from the shaft 56 to the shaft 7 of crank 5 by the same means as was employed in connection with crank 1, that is, a worm-and-worm-wheel reduction gear train 57—58. Since the worm wheel 58 is, of course, carried by the structure 8 along with the latter's reciprocating motion, the worm 57 must not, in the form shown, be locked to the shaft 56 any more than against rotation. Means for displacing the worm 57, together with the structure 8 along the shaft 56, includes, in the form shown, adjustable brackets mounted on the structure 8 on either side of the worm 57. The brackets are provided with locked set screws in abutment with a thrust bearing (not shown in detail), bearing up against both ends of the worm 57. With such an arrangement, adjustment may be made against binding the worm and to take up any axial slack that may develop. The worm 57 is also slidably keyed to the shaft 56 in the keyway on 56. Thus, with this construction, it may be seen that identical angular velocities may be imparted to the crank 1 and to the crank 5, even while the structure on which the crank 5 is mounted is being made to reciprocate back and forth. If, as in some cases, for example in the development shown in Fig. 6, there is no need for the motion obtained from the crank 5, the crank 5 may be declutched from the prime mover as by the clutch 80 between the gear 54 and shaft 56, as will be understood.

It will be recalled from the discussion in connection with Figs. 7, 8 and 9 that crank 5 drives all the mechanism, taking account of difference in size of pipes and relative offset of the pipes joined. In the specific assembled embodiment shown, the crank 5 is adjustable and set to correspond with the radius of the smaller pipe. The pin roller 6 on the end of the crank 5 engages guide means 12, in the form shown a pair of longitudinally extending tracks or ways rigidly mounted to a slide member 13. The slide member 13 is preferably slidably carried on a pair of guide shafts 14 extending generally transversely of the guide means 12. The slide guide shafts 14 may also be rigidly secured to the sliding structure 8, as will be clear. It will be appreciated that as crank 5 rotates it imparts a generally vertical, simple-harmonic reciprocating motion to the slide member 13. The reciprocation thus imparted may then be further transmitted by means of guide means 15, which may include a pair of longitudinally extending bars which are adjustably securable to the sliding member 13. It will be recalled that the transverse displacement of the guide means 15 with respect to the guide means 12 represents the amount of offset X between the respective axes of the pipes that are to be joined. In the assembly drawings (see Fig. 3 in particular), it will be appreciated that the machine has been adjusted to make a cut for a pipe joint in which the axes of both pipes intersect one another; in other words, there is no axial offset, since the guide means 12 and 15 are opposite one another.

Account is next taken of the size of the larger pipe, that is, the size of the pipe to which the pipe being cut is to be joined. In the form shown, means for accomplishing this compensation includes a standard or pedestal member 18, rigidly secured to the structure 8 and pivotally carrying a crank 19 of the same general character as the cranks 1 and 5. (It will be recalled from the geometric considerations of Figs. 7, 8 and 9 that the center of rotation of the crank 19 should be the same as that for the crank 5 in order to obtain a true compensating effect.) The crank 19 is preferably also of adjustable effective length and includes a pair of pin rollers 20 and 21 adjustably slidable lengthwise thereof.

Since the pin roller 20 engages the guide means 15 and since the effective radius R of the crank 19 is larger than the effective radius r of the crank 5, it will be understood that the crank 19 will be constrained to move through some sort of oscillatory movement as the crank 5 rotates. The longitudinal component of the above-mentioned oscillatory movement of the crank 19 may be transmitted to a longitudinally sliding unit 23 by means of the pin roller 21 operating in transversely extending guide means 22. In the form shown, this guide means is a pair of parallel bars secured to the slide unit members 23, longitudinally slidable with respect to the structure 8 on guide shafts 24—24 which are secured to the structure 8, as will be clear.

Up to this point, sufficient mechanism has been described on the structure 8 to produce the developed biases shown in Figs. 7 and 8. All that is needed now to make the machine of universal application for the cutting of biases is some mechanism equivalent to that shown in Fig. 9 for compensating for the change in value $a$ to $$\frac{a}{\cos \alpha}$$

In order to accomplish this corrective effect, I provide a transversely extending arm 23ª secured to the longitudinal sliding means 23. The effective length of the arm 23ª, as determined by the positioning of a pin roller 27 adjustable along the length of the arm 23ª, is adjusted in accordance with a calculated value $b$, a function of $\alpha$. The compensating mechanism further includes a crank 29 rotatable about a point on the sliding structure 8 and engageable with the pin roller 27 on arm 23ª, as by guide means 28. Slide means 33, slidable in the member 29, pick up motion from the crank 29. The slide 33 is pivotally related to a longitudinally slidable assembly 31, slidable (in the form shown) in slide bearings 30—30 along longitudinally extending guide rods 25—25 securely fixed with respect to the sliding structure 8. It will be appreciated that, when the transverse disposition of pin roller 27 has been adjusted according to the value $b$, equal to $C(1-\cos \alpha)$, the longitudinal displacement of the sliding members 30—31 will represent a value including the corrective factor $$\frac{1}{\cos \alpha}$$

—the value C being a chosen quantity represented by the transverse component of the distance from the center of rotation of the crank 29 and the axis of rotation of the crank 5. The center of rotation of crank 29 need not be directly under the center of the crank 5 and, on the contrary, the position of the center of crank 29 and the length thereof (within reason) may be varied.

The mechanism thus far described will be understood to incorporate features taking into account the four variables encountered when joining pipes of different sizes to each other at an angle and with some axial offset. As far as motion of the cutting implement is concerned, then, that has been fully determined and all that remains to be done is to provide some clamping or holding device for securing the cutting implement 35 to the sliding members 30—31. In the form shown, a gas torch 35 is employed as the cutting implement, and means are provided for adjusting its vertical disposition to accommodate whatever size of pipe is to be cut.

As will further be recalled from discussions in connection with Figs. 6 to 9, it is necessary for the proper functioning of the machine thus far described that the pipe to be cut be rotated in timed relation with the cycle of reciprocating movement of the cutting implement 35 (T).

In the form shown, this movement is obtained from a reduction gear train driven primarily from the shaft 55 which, in addition to driving the crank 1 gear train, carries a pinion 62 (Fig. 4) meshing with a gear wheel 63. The shaft upon which the gear 63 is mounted is securely journaled to the frame 4 of the machine and also carries a pinion 64 keyed thereto. The pinion 64 meshes with a gear 61, which in turn meshes with an annular gear 47, preferably of the same size as the gear wheel 61. The annular gear 47, in the form shown, forms part of the pipe holding and rotating means, as will later be clear.

The pipe holding means may be any suitable clamping means which will permit of the free rotation of the pipe about its axis while so being held. The section of pipe 60 to be cut is longitudinally disposed with respect to the machine and in the supporting device may rest on supporting rollers 43—43, fixedly related to the machine frame 4. The rollers 43 are shown adjustable so that no matter what size of pipe is to be accommodated in the clamping mechanism, it may be adjusted to make the pipe axis coincide with the axis of the clamping mechanism. A suitable supporting roller device 43 for this purpose is shown clearly in Fig. 3 where screw means is provided for vertical adjustment of the pipe, and lateral differential screw means is provided to make further supporting rollers fit accurately to the circumference of the pipe to be cut. A preferred form of locking means for securing the pipe to the clamping device includes a chain extending circumferentially of the pipe and adjustably securable thereto by the take-up screw means shown. The clamping apparatus just described may be secured against rotation, or rather to rotate as a unit with an annular sleeve or drum member 40, as by the pin means 45—46, locking the member 40 to the block 44. The annular pipe-carrying sleeve member 40 is freely rotatable about its axis and in the form shown is supported by rollers 41 mounted in a housing 42, extending generally circumferentially of the member 40. The gear 48, which has been mentioned above in connection with the driving mechanism, may form a part of or may be secured to the drum member 40. It will now be appreciated that there is a definite time relationship between rotation of the cranks 1 and 5 and that of the pipe carried in the clamping mechanism.

At this point enough mechanism has been described to perform any operation connected with the cutting of a bias on a piece of pipe which is to fit at any angle or degree of offset with another larger piece of pipe.

Only five adjustments need be made in setting up the machine to take care of such work. The crank arm 1 may be adjusted to a length corresponding to the value of $r \tan \alpha$, that is, if there is an angle $\alpha$ to be considered. Otherwise, the clutch 81 would be thrown out, as will be clear. Adjustment in accordance with the radius $r$ of the smaller pipe should be made on the crank arm 5. Compensation for the axial displacement X of one pipe with respect to the other may be made by adjusting the guide means 15 appropriately with respect to guide means 12. The crank 19 should be adjusted in accordance with the radius R of the larger pipe, and the pin roller 27 should be displaced transversely from the axis of the crank 5 a distance corresponding to the calculated value $b$. As has been pointed out in conjunction with the description of crank 5, if it is desired to make a cut as shown in Fig. 6 where the value of $\alpha$ is the only variable to be considered, the crank arm 5 and all the mechanism it drives may be declutched to render the latter ineffective by throwing out the clutch 81, as will be understood. For ease in setting up the machine graduated scales may be provided in connection with each of these adjustments so that no calculations need be made. Indications may then be read off in units corresponding to those in which the respective quantities are determined or measured.

As a practical matter it will be appreciated that the crank 5, representing the radius $r$ of the smaller pipe, should be set in accordance with the inside radius of that pipe; and the crank 19, representing the radius R of the larger pipe, should be set to correspond with the outside radius thereof. The reason for such adjustment is that the inside surface of the smaller pipe is being cut to fit snug against the outer surface of the larger pipe, and the bias cut must of course be made in accordance with such a fit.

Having thus described the theory and apparatus for cutting biases on the ends of pipes, a corresponding description of the cutting of holes in the larger of the pipes with the same apparatus will now be given. A preliminary comparison between the considerations for bias cutting and hole cutting may now be made.

Referring to Fig. 10, several types of pipe joints are laid out, the quantities involved in setting up the machine either to cut for biases or for holes being appropriately labeled. Referring particularly to the extreme right-hand diagram of Fig. 10 in which the angle $\alpha$ is greater than 45°, it will be recalled that the determining factors involved in the cutting of a bias for this type of joint are the following: $r \tan \alpha$ for the setting on crank 1;

$$\frac{a}{\cos \alpha}$$

obtained by setting distance $b$ equal to $$C(1 - \cos \alpha)$$

the radius $r$ of the small pipe and the radius $R$ of the large pipe, as settings of cranks 5 and 19, respectively. The cutting implement in that case was urged in accordance with the above-indicated factors longitudinally of the small pipe. Since, in the form of my apparatus shown, the cutting implement is always moved longitudinally with respect to the pipe being cut, it follows that, for the cutting of a hole corresponding to the bias cut on the small pipe, the determining values which have just been enumerated for the small pipe must be translated into their effective components longitudinally of the larger pipe in order to determine what the settings on the various cranks and arms must be for a proper hole cut in the larger pipe.

From the geometry of the diagram under consideration, it will be seen that the value corresponding to $r \tan \alpha$ longitudinally of the larger pipe equals $$\frac{r}{\cos \alpha}$$

and will therefore be the determining factor for the setting on the crank 1. Whether the small pipe or the larger pipe is being cut, the respective radii of the two pipes remain the same, and the settings on cranks 5 and 19 will therefore be the same, that is, $r$ on crank 5 and $R$ on crank 19. It will also be appreciated from the geometry of the diagram that the longitudinal component of the value $$\frac{a}{\cos \alpha}$$

is $a \tan \alpha$. By simple trigonometry, it may be shown that, if the arm 23 is set to have a value $b$ equal to $C(1 - \cot \alpha)$, an appropriate compensation for the quantity $a$ in the case of an angular pipe joint may be obtained longitudinally of the larger pipe.

As far as setting up the machine to impart appropriate translatory motion to the cutting implement T in making a hole cut is concerned, all the pertinent values have been indicated. However, since a hole is to be cut, it will be appreciated that the pipe-rotating mechanism must not make a complete revolution but must, on the other hand, be made to oscillate in timed relation with the reciprocation of the cutting implement and also in accordance with the respective radii of the pipes to be joined together with the amount of axial offset of the two pipes.

Apparatus accounting for all the considerations necessary in determining such oscillatory movement is shown schematically in Fig. 11. The showing in Fig. 11 represents the simplified case arising when the axes of the two pipes intersect, i. e., when X equals 0. A driving crank 65, adjustable as to length and carrying pin means 66 at its outer end, is preferably driven in such timed relation with the cranks 1 and 5 that all three complete their cycles in the same period of time. The pin means 66 slidably engages guide means 67, and the latter is preferably rigidly mounted on a sliding block member 68, slidable transversely of the guide means 67 on guide rods 69. Thus, when the radius of the crank 65 is adjusted to a value corresponding to the radius of the small pipe, it will be seen that a steady rotation of crank 65 will impart simple-harmonic transverse reciprocating motion (of a stroke equal to $2r$) to the guide means 67. Additional guide means 70 are also preferably secured to the block 68, and with the aid of pin means 76, adjustable on a crank 75 having a fixed center coaxial with that of the crank 65, the reciprocating motion of slide 68 may be translated into rotary oscillatory motion on the crank 75. When the effective length of the crank 75 is adjusted to a value equal to the radius R of the large pipe, it will be appreciated that the oscillation then imparted to the crank 75 properly accounts for the respective radii of the two pipes. This properly compensated oscillatory motion may be transmitted into appropriate oscillation of the large pipe to be cut by gear means 74, 48 shown. The respective gears 74 and 48 preferably have the same number of teeth so that a faithful reproduction of the compensated oscillatory motion of the crank 75 may be imparted to the pipe holding means. As a measure of the oscillation imparted to the pipe, the angle B represents the angle subtended by the full stroke of the aforesaid rotary oscillation.

It will be appreciated that when the mechanism just described is combined with the mechanism driven by cranks 1 and 5, adjusted in accordance with the corrective determining values for cutting holes, a generally ovate incision of the general character indicated in the right-hand portion of Fig. 6 will be generated by the respective motions of the cutting implement T and the rotary oscillation of the pipe.

A slight modification of the apparatus described in connection with Fig. 11 may be made properly to take account of the amount of offset X between the respective axes of the pipes being joined. Reference in this connection is made to Fig. 12, in which it will be seen that provision has been made for adjusting the guide means 70 to be displaced transversely of the guide means 67 a distance equal to the offset X. Because of the odd character of this type of incision, the latter is shown analytically developed as viewed from two relatively perpendicular aspects. It will be noted that since this incision is representative of an offset joint, the angle B subtended by the extremities of the incision is not made up of uniform components as was the case of a joint with no offset; but it is rather composed of the angle $B^1$ traversed in one-quarter cycle of operation, and the angle $B^2$ traversed in a succeeding quarter cycle of operation, as will be clear.

Now, returning once more to cases illustrated in Fig. 10, let us next consider the case of when the angle $\alpha$ equals 45°. This may be considered a somewhat simplified special case, in that the value of $\cot \alpha$ is 1 at 45°. The quantity $b$ then becomes 0, and all that has to be set up with regard to movement of the cutting implement T is an adjustment of the crank 1 equal to $$\frac{r}{\cos \alpha}$$

and a setting of the cranks 5 and 19 equal to the respective radii $r$ and R of the two pipes.

In the case occurring when $\alpha$ is less than 45°, the value of $\cot \alpha$ is greater than 1, so that the quantity $b$ becomes a negative quantity; and, if the same set-up procedure were followed, as in the cases of $\alpha = 45°$ or more, there would have to be an extension of the arm 23 to accommodate the sliding pin means 27 above the axis of the crank 5 (i. e. in a negative sense), as will be clear. However, such an extension will not be necessary if the pin roller 27 be adjusted coaxially with the center on crank 5, that is if $b$ equal 0 and if the crank 5 be set at a value equal to $r$ Tan $\alpha$ (the settings on cranks 1 and 19 being the same as in the case of $\alpha=45°$ or more. The appropriateness of this setting on crank 5 equal to $R$ Tan $\alpha$ will be appreciated from a study of the geometry of the diagrams of Fig. 9 and the one for less than 45° (Fig. 10).

For the very special case of when $\alpha=0$ and when a hole is to be cut, crank 5 is set for $r$ and crank 19 for R; that is, the same adjustment is made as in the case of cutting a bias on the end of a pipe.

In Figs. 13 and 14, I show schematically a possible improved compensating device of more universal application than that shown in Fig. 9 and intended to replace the latter. The slide 23 will be recalled as that receiving longitudinal displacement motion from the crank 19. It is this motion that is to be corrected for the value $a$. The slide 23 preferably carries as before transversely extending guide means adjustably carrying pin means 27. The pin means 27 is also engageable as before in guide means 28 running lengthwise of the crank 29. In this preferred form, the crank 29 carries additional guide means 128 extending lengthwise of the crank 29; and the guide means 128 transmits corrected longitudinal displacement motion to the cutting implement slide 30 through pin means 127, carried adjustably on transversely extending bar means fixed to the slide 30.

For cases when the angle $\alpha$ equals 45°, that is, when no compensation for $a$ is required (Tan $\alpha$ and Cot $\alpha$ being equal to 1 and making the quantity $b$ equal 0), both the pin means 27 and 127 should be adjusted coaxially with the crank 5, as will be clear. For values of $\alpha$ less than 45°, the value $b$ will determine the position of the pin means 127, the pin means 27 remaining coaxial with the crank 5; and for values of $\alpha$ greater than 45°, the value $b$ will determine the positioning of the pin means 27, the pin means 127 being adjusted coaxial with the crank 5. It will be seen that with this improved compensating device, there will be no need to extend the transverse bar means 23 above the axis of crank 5, and the determination of the quantity $b$ may be more readily made throughout the complete angular range of possible pipe connections.

Having thus set forth the geometrical considerations with regard to an appropriate mechanism for oscillating a pipe, I shall now describe a preferred embodiment of this mechanism as incorporated in the machine shown in Figs. 1, 2, 3, and 4.

Figure 1:
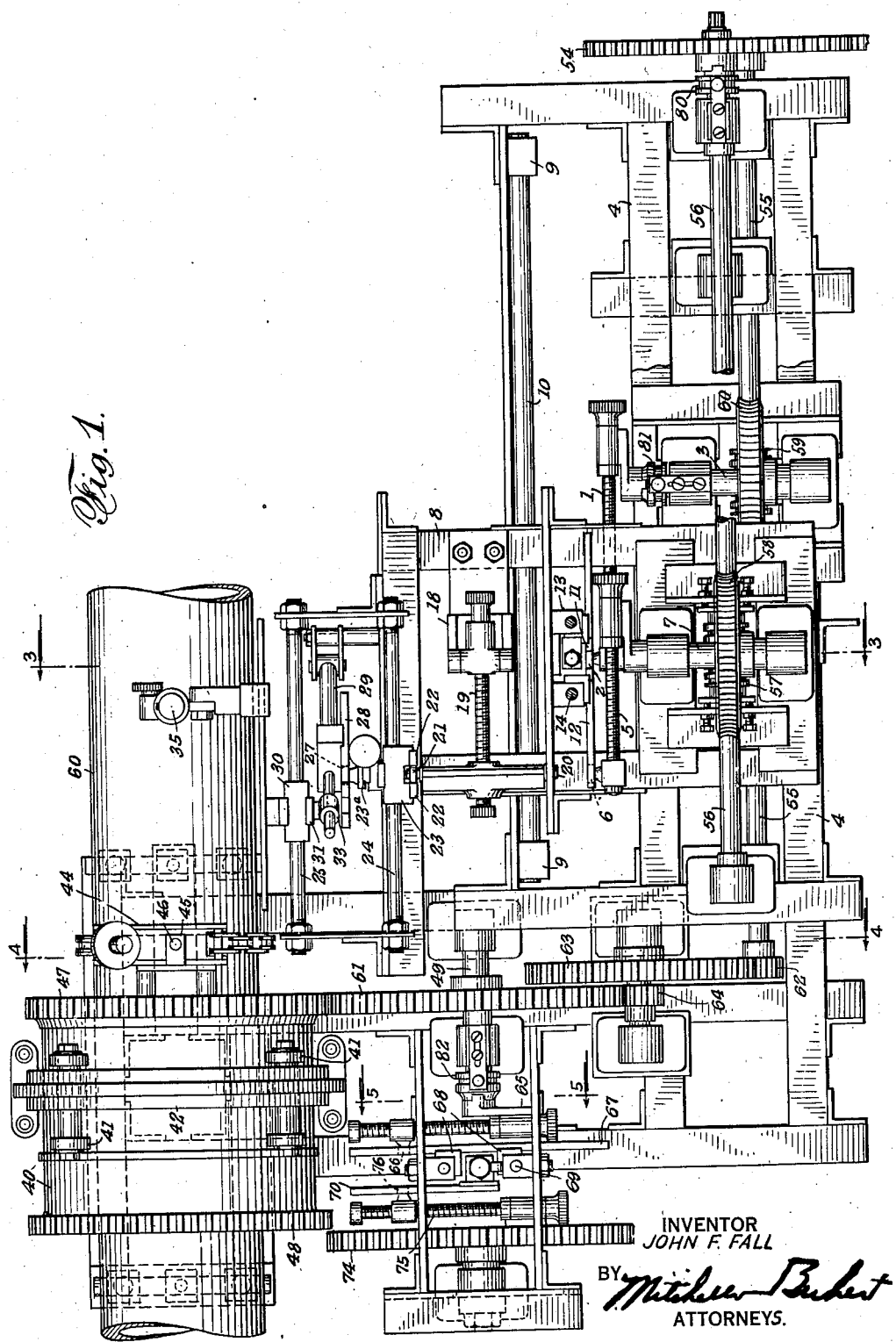
Fig. 1 is a plan view of a machine, incorporating features of the invention.
Figure 2:
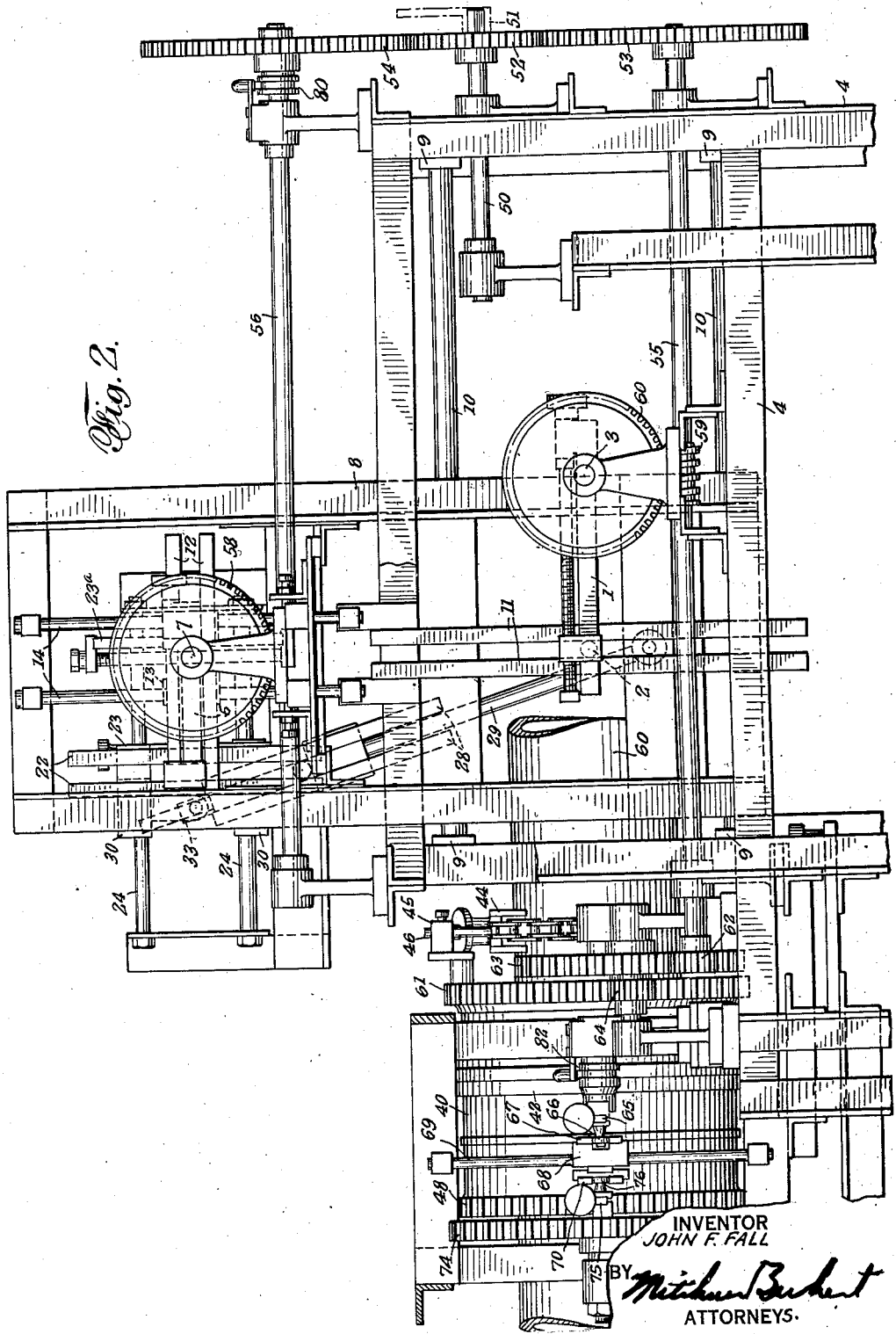
Fig. 2 is a view in front elevation of the machine shown in Fig. 1.
Figure 3:
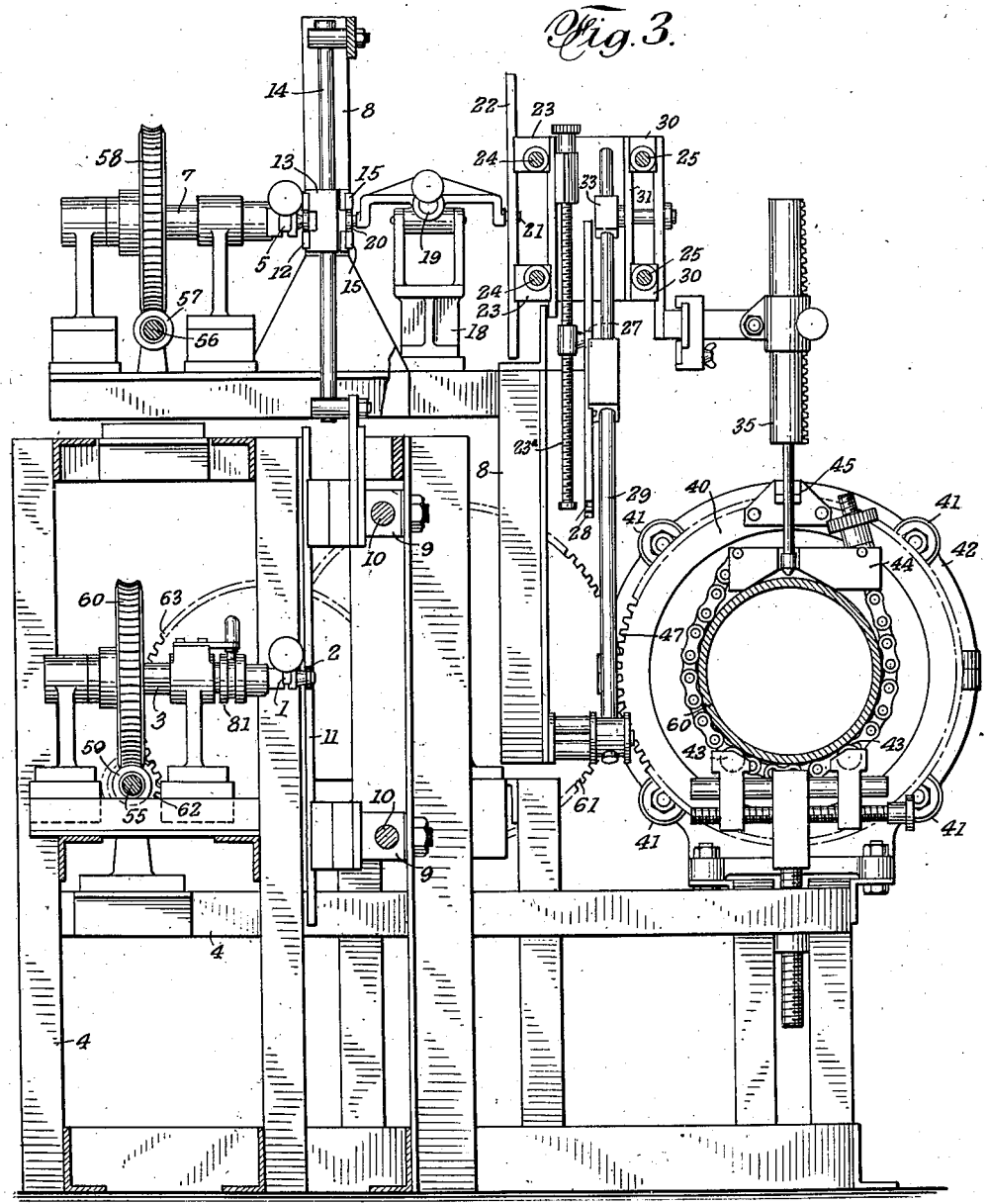
Fig. 3 is an end view of certain parts illustrated in Fig. 1, the view being taken substantially in the plane of the line 3—3 of Fig. 1.

Since the driving motion required for rotating the pipe in one case is uniform (as when a bias is cut) and in other cases is an oscillatory motion (as when a hole is cut), I provide selective means for selectively engaging only one of these mechanisms to the pipe holding means at a time. It will be recalled that (for bias cuts) a steady rotary drive was imparted to the annular gear 47 on the pipe holding means through direct gearing, in the form shown the gear train 62, 63, 64, 61 from shaft 55. In a preferred embodiment I provide additional annular gear means 48 associated with the pipe holding means and preferably of the same general character as the annular gear 47 as to the number of teeth. It will further be recalled that the annular drum or cylindrical member, to which the gears 47 and 48 are mounted, and which functions directly to rotate the pipe to be cut, is supported for free rotation by a number of circumferentially spaced rollers 41. With particular reference to Fig. 1, it will be observed that I have so disposed the rollers 41 upon the outer cylindrical surface of the drum 40 to permit sufficient axial play or dislocation for a disengagement of the gear 47 from the drive gear 61.

In the form shown in Fig. 1 the mechanism for oscillating the pipe is preferably driven from the gear 61, fixed to a shaft 49, when the gears 47 and 61 are out of engagement. Drive motion from the shaft 49 is transmitted directly to an adjustable crank member 65, which may be of the same general character as the cranks 1 and 5. The crank 65 in the form shown carries pin-roller means 66, which may be adjustably disposed along the crank 65. It will be recalled from the discussion in connection with Figs. 11 and 12 that the radius of the crank 65, as determined by the positioning of the pin-roller 66, should be set to correspond with the radius $r$ of the smaller pipe.

The pin-roller 66 is preferably engageable in guide means 67 securely mounted to a pair of sliding members 68, slidable on guide rods 69 generally transversely of the longitudinal sense of the guide means 67. It will then be seen that, as the crank 65 rotates steadily, simple-harmonic transverse reciprocating motion will be imparted to the slide 67. In addition to carrying the guide means 67 the sliding block 68 also preferably carries further similar guide means 70 extending in a parallel sense to that of the guide means 67 and adjustably displaceable therefrom. It will be recalled that the displacement of the guide means 70 from the guide means 67 represents the amount of offset X between the axes of the two pipes to be joined.

The transverse reciprocating motion of the guide means 70 in the form shown is next transmitted by pin-roller means 76 to an adjustable crank arm 75, which is rotatable about an axis concentric with that of the crank 65. The crank 75 in the form shown is secured to a gear 74 coaxial with the gear 61; and, when the former is adjusted to a length corresponding to the radius R of the larger pipe, it will be appreciated that an oscillatory motion similar to that described in connection with Figs. 11 and 12 will be imparted to it. The gear 74 is preferably of the same size as to number of teeth as the gears 61, 47, and 48, for purposes which have been indicated above. It will be appreciated that the same axial dislocation or displacement of the pipe-holding unit (carrying the gears 47 and 48) that is made to disengage the drive from the gear 47 may also be employed to engage the gear 48 to mesh with its drive gear 74.

A complete mechanism has thus been set forth for proper generation of hole cuts. All that need be done, then, to change the illustrated machine over to accommodate the larger piece of pipe in which the hole is to be cut is to disengage the gear 47 from its drive and at the same time engage the gear 48, set the crank arm 65 in accordance with the radius $r$ of the small pipe, adjust the displacement between the guide means 67 and 70 in accordance with the offset X of the joint, and adjust the crank arm 75 to a radius R equal to that of the large pipe. It will then be appreciated that, as the prime mover of crank 51 is rotated, cranks 1 and 5 appropriately adjusted as described above will impart proper longitudinal displacement motion to the cutting implement 35, while crank 65 will impart a correspondingly appropriate oscillatory movement to the piece of pipe being treated.

It will be understood, of course, that the cranks 65 and 75 may be provided with appropriate scales, as was the case with the cranks 1, 5, and 19, to aid the operator when setting up the machine. Likewise, and for the same purposes, an index scale may be provided for reading off the offset X adjustment of the guide means 70 with respect to the guide means 67, as will be clear.

For setting-up or other purposes, it might be desirable to have the pipe-holding members as freely rotatable as possible. Thus, if the gear 48 is meshing with the gear 74, I provide clutch means 82 for disengaging the crank 65 from the shaft 49 so as to disengage most of the gear train back to the prime mover 51.

It will be appreciated that I have provided and indicated means for the efficient and universal cutting of pipes whether it be a bias on the end of a smaller pipe to be fitted to a larger one or one of the same size; or a hole in the larger pipe which the smaller pipe is intended to fit.

While the invention has been described in considerable detail in connection with the cutting of pipe, it is to be understood that this adaptation was merely for illustrative purposes. Fundamentally the machine is adaptable to the generation directly on a generally cylindrical or other body of the line of intersection with that body either of a plane or other like or similar body. It is further to be understood that the invention is not limited merely to the precise mechanism shown. Additional or alternative apparatus for generating ellipses, parabolal, hyperbolal, and other mathematical shapes, may be included in the mechanism to derive appropriate intersection lines without departing from the spirit of the invention.

It is also to be understood that various additions, modifications, and omissions may be made within the scope of the invention as defined in the appended claims.

I claim:

1. In a machine of the character indicated for cutting a pipe to be joined to another pipe, means for angularly moving a pipe, a tool, means for constraining said tool to move in a straight line parallel to the axis of the pipe to be cut, a frame constrained to move in a straight line parallel to the axis of the pipe to be cut, crank means acting directly on a part of said frame means for moving said frame means, and crank means mounted on said frame for moving said tool relatively thereto.

2. In a machine of the character indicated for cutting a pipe to be joined to another pipe, means for angularly moving the pipe to be cut, a tool, means for constraining said tool to move along an element of the pipe to be cut, a frame, crank means acting directly on a part of said frame for moving said frame, and crank means carried by said frame for actuating said tool, whereby said tool will be moved by said crank means acting on said frame and the movement of said tool will be modified by said crank means carried by said frame.

3. In a machine of the character indicated for cutting a pipe to be joined to another pipe, means for moving the pipe angularly, a tool, means for constraining said tool to move in a straight line parallel to the axis of the pipe, crank means for moving said tool, and multiplying means including a swinging link for multiplying the motion transmitted to said tool by said crank means.

4. In a machine of the character indicated for cutting a pipe to be joined to another pipe, means for moving the pipe angularly, a tool, means for constraining said tool to move along a line parallel to the axis of said pipe, a frame, means for constraining said frame to move along a line parallel to the axis of said pipe, a crank for reciprocating said frame with a simple harmonic motion, and means carried by said frame and actuating said tool, said last mentioned means including crank means to modify the motion transmitted to said tool by the harmonic movement of said frame.

5. In a machine of the character indicated for cutting a pipe to be joined to another pipe, means for angularly moving the pipe, a tool, means for constraining said tool to move along a line parallel to the axis of the pipe to be cut, means for reciprocating said tool along said line parallel to the axis of the pipe, said means including a crank for imparting a simple harmonic motion to one element, means driven by said element for actuating said tool, said last mentioned means including crank means for modifying the harmonic motion transmitted to said element.

6. In a machine of the character indicated for cutting a pipe to be joined to another pipe, means for angularly moving the pipe to be cut, a tool, means for reciprocating said tool along a line parallel to the axis of the pipe while the latter is being moved angularly, said means including crank and cross-head means for transmitting harmonic motion, and crank means carried by said first mentioned means for varying said harmonic motion and transmitting said varied harmonic motion to said tool.

7. In a machine of the character indicated for cutting a pipe to be joined to another pipe, means for moving the pipe angularly, a tool, means for constraining the tool to move in a straight line parallel to the axis of the pipe to be cut, means for moving said tool along a straight line as aforesaid, said means including crank and cross-head means for transmitting harmonic motion to an element, crank and cross-head means for modifying the harmonic motion transmitted to said element, and means connecting said last mentioned means to said tool for moving the latter parallel to the axis of the pipe.

8. In a machine of the character indicated for cutting a pipe to be joined to another pipe, means for moving the pipe angularly, a tool, means for constraining the tool to move in a straight line parallel to the axis of the pipe to be cut while the latter is moved angularly, said means including a frame constrained to move in a straight line parallel to the axis of the pipe to be cut, crank means acting directly on a part of said frame for moving said frame parallel to the axis of the pipe to be cut while the latter is being given an angular movement, and crank means carried by said frame for modifying the motion thereof transmitted thereby to said tool.

9. In a machine of the character indicated for cutting a pipe to be joined to another pipe, means for oscillating the pipe through an angle of less than 180°, a tool, means for constraining the tool to move along a straight line parallel to the axis of the pipe to be cut, a plurality of crank means and crank followers movable in directions at right angles to each other for moving said tool along said straight line in one direction and back to the starting point while said pipe is being oscillated one complete cycle of less than 180°.

10. In a machine of the character indicated for cutting a pipe to be joined to another pipe, means for oscillating the pipe through an angle of less than 180°, a tool, means for constraining the tool to move along a straight line parallel to the axis of the pipe to be cut, means for moving said tool along said straight line in one direction back to the starting point while said pipe is being oscillated one complete cycle of less than 180°, said means for moving said tool including a movable frame, means for constraining said frame to move along a straight line, crank means for moving said frame, crank means carried with said frame for transmitting motion to said tool whereby the motion transmitted to said tool by said movable frame will be modified by said crank means carried with said frame.

JOHN FRANCIS FALL.